US006601172B1

(12) United States Patent
Epstein

(10) Patent No.: US 6,601,172 B1
(45) Date of Patent: Jul. 29, 2003

(54) TRANSMITTING REVISIONS WITH DIGITAL SIGNATURES

(75) Inventor: Michael Epstein, Spring Valley, NY (US)

(73) Assignee: Philips Electronics North America Corp., New york, NY (US)

( * ) Notice: Subject to any disclaimer, the term of this patent is extended or adjusted under 35 U.S.C. 154(b) by 0 days.

(21) Appl. No.: 09/002,098

(22) Filed: Dec. 31, 1997

(51) Int. Cl.[7] ................................................. H04L 9/00
(52) U.S. Cl. ...................... 713/178; 713/177; 713/179; 713/180; 713/200; 380/287; 380/28; 705/76
(58) Field of Search .............................. 380/23, 25, 30, 380/49, 28, 287; 713/100, 156, 157, 170, 176, 177, 178, 179, 180; 705/76

(56) References Cited

U.S. PATENT DOCUMENTS

| 5,022,080 A | * | 6/1991 | Durst ........................... 380/23 |
| 5,136,646 A | * | 8/1992 | Haber et al. ................... 380/49 |
| 5,347,579 A | * | 9/1994 | Blandford ..................... 380/25 |
| 5,781,629 A | * | 7/1998 | Haber et al. ................... 380/23 |

FOREIGN PATENT DOCUMENTS

WO          98/02120      * 12/1998

OTHER PUBLICATIONS

Schneier, Applied Crytography, 2nd ed., pp. 38, 39 and 75–78, 1996.*
'How Timestamp.com's Technology Operates'. [retreived on Dec. 10, 1998].*
Haber et al., "How to Time–Stamp a Digital Document," Journal of Cryptology, vol. 3, No. 2, pp. 99–111, 1991.*
Haber et al., "How do Digital Time–Stamps Support Digital Signature?," Cryptobytes, RSA Laboratories, 1995.*
Bayer et al., "Improving the Efficiency and Reliability of Digital Time–Stamping," Sequences II: Methods in Communication, Security, and Computer Science, pp. 329–334, Mar. 1992.*

* cited by examiner

*Primary Examiner*—Albert Decady
*Assistant Examiner*—Paul E. Callahan
(74) *Attorney, Agent, or Firm*—Michael E. Belk

(57) ABSTRACT

In a computer network, documents are produced, the document is hashed to produce a fingerprint, and the fingerprint is encrypted to sign the document then the document signature is transmitted from the user system to a secure computer system. The secure computer system creates a time stamp including the document signature and a digital time. The secure system signs the time stamp to verify its origin. The time stamp and notary's signature are transmitted from the secure system to the user's system. The user has access to the notary's public key which is used for determining whether the time stamp is authentic. Then, if the document is revised, the revised document is hashed and the hash is combined with an indication that the revision is related to the original document. The indication could be a hash of the original document, the original document signature, the notary's time stamp for the original document, or the notary's signature for the original document.

58 Claims, 15 Drawing Sheets

TRANSMITTING REVISIONS WITH DIGITAL SIGNATURES

FIELD OF THE INVENTION

The invention is related to the field of cryptography and more specifically to cryptographically timestamping documents to prove their existence at a certain time

BACKGROUND OF THE INVENTION

In many common situations people need to verify that a digital document (i.e. a document that is digitally stored in a computer system) existed on a certain date. That is, we may need to prove that no one has altered or revised the digital document since a certain date such as the alleged creation date or transmittal date of the document.

One method of providing such proof is known as electronic notarizing or timestamping. A one-way hash of the document is produced, and the hash is encrypted using a private key of the owner of the document to form a so called digital signature. The signature is sent to a digital notary or time stamper who combines the signature with a digital time (digital representation of the time and date) and encrypts the combination using the digital notary's private key to form another digital signature. Then the notary sends his new digital signature to the author. The author can prove that the author's signature for a report existed at the day of certification. Anyone with the notary's public key can decrypt the notary's signature and prove that the document was originally encrypted by someone who had access to the private key.

Notarizing digital documents is disclosed in U.S. Pat. No. 5,136,646. Notarizing by secure hardware in a system is disclosed in U.S. Pat. No. 5,001,752. Public key cryptography is disclosed "New Directions in Cryptography" by Diffie and Hellman in IEEE Transactions On Information Theory, Vol IT-22, November 1976, pp 644–654 and in U.S. Pat. Nos. 4,405,829 to Rivest and 4,868,877. One-way hashing is disclosed in "Collision-Free Has Functions and Public Key Signature Schemes", Advances in Cryptology—eurocrypt '87, Springer-Verlag, LNCS, 1988, vol. 304, pp. 203–217.

The above citations are hereby incorporated in whole by reference.

SUMMARY OF THE INVENTION

It is an object of the invention to provide methods and apparatus for the authentication of revisions.

In the inventions disclosed herein an original document and a revised document are notarized so that relationship between the original document and revised document can be proved as well as the origination and the time of the revisions notarization.

In one embodiment of the invention the original document is notarized, then later the document is revised and the revision and its relationship to the original document is notarized. In another embodiment the original document and an automatically generated revision of the document is simultaneously notarized. This allows the authorship and generation time of automatically generated revisions such as a lossy compression of information to be proved.

Other alternatives and advantages of applicant's inventions will be disclosed or become obvious to those skilled in the art by studying the detailed description below with reference to the following drawings which illustrate the elements of the appended claims of the inventions.

DETAILED DESCRIPTION OF THE PREFERRED EMBODIMENT

Figure 1A:
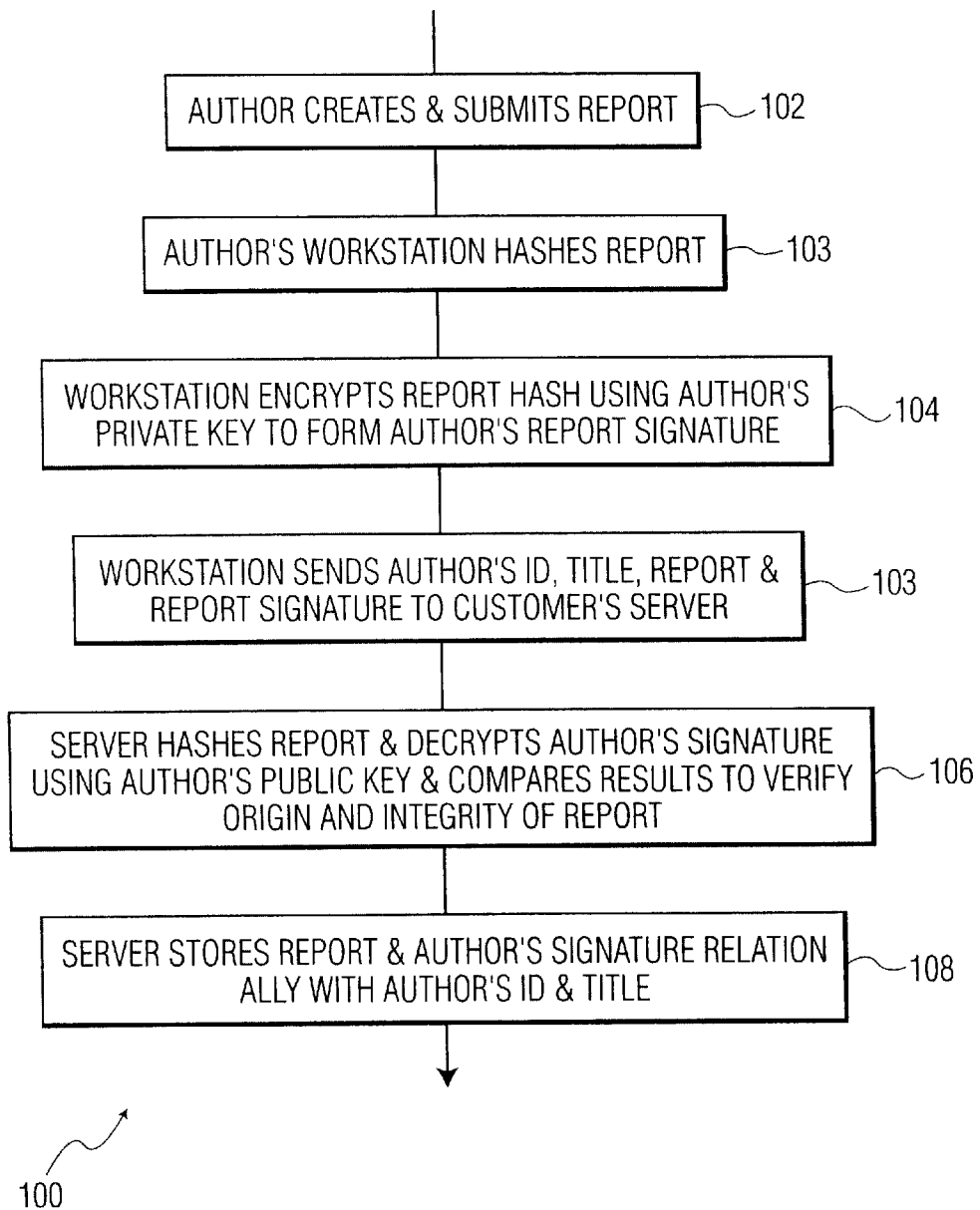
FIGS. 1a–1d shows a flow chart of a specific embodiment of the invention for authenticating revisions.

FIGS. 1a–1d shows a specific embodiment of the invention for authenticating revisions. FIG. 1a shows a first group 100 of steps of the method in which software loaded in the author's workstation signs the digital document so others can authenticate the origin of the author. The author has a private key that can encrypt digital information and a public key that can decrypt the information. The author has made the public key publicly available for example on a server where others who which to verify the origin or integrity of the report can access the report and the public key. In a first portion 100 of the invention, in step 102, an author creates a report using software loaded onto the workstation connected to a server in a network, and inputs a command to submit the report to the server.

The report is the type of information that someone may desire to prove originated from the author or to prove that the information of the report has not been altered. In step 103, the author's workstation hashes the report using a specified one-way hashing method. The advantage of a one-way hash is that it can not be reversed to decode the document, so that even if the document were confidential or private the hash would not have to be kept confidential. In step 104, the workstation encrypts the hash using the author's private key to form the author's signature of the report. The purpose of the encryption is to provide proof that the author is the originator of the report, and that the report has not be altered by others. The encryption of the hash has nothing to do with keeping the data or the hash secret. In step 105, the workstation stores the report, hash and signature relationally in the workstation. Herein, relationally just means that information that the report is related to the signature and vice versa is also stored in the server. In step 106, the workstation transmits the report and the author's signature for the report to a customer's server. If the contents of the report are confidential or private then a secure connection is formed between the workstation and the server before the transmission. In step 107, the server hashes the report and decrypts the author's signature using the author's public key. Then the server compares the hash of the report to the decrypted signature to verify that they match. If they match, the server knows that the signature and report are from the author because it was the authors public key that decrypted the signature, and the server knows that the signature and report have not been altered since the author signed the report. In step 108, the server stores the report the author's identification (ID), and the author's signature relationally in the server's storage. Again herein, relationally just means that information that the report, author's ID, and signature are related.

Figure 1B:
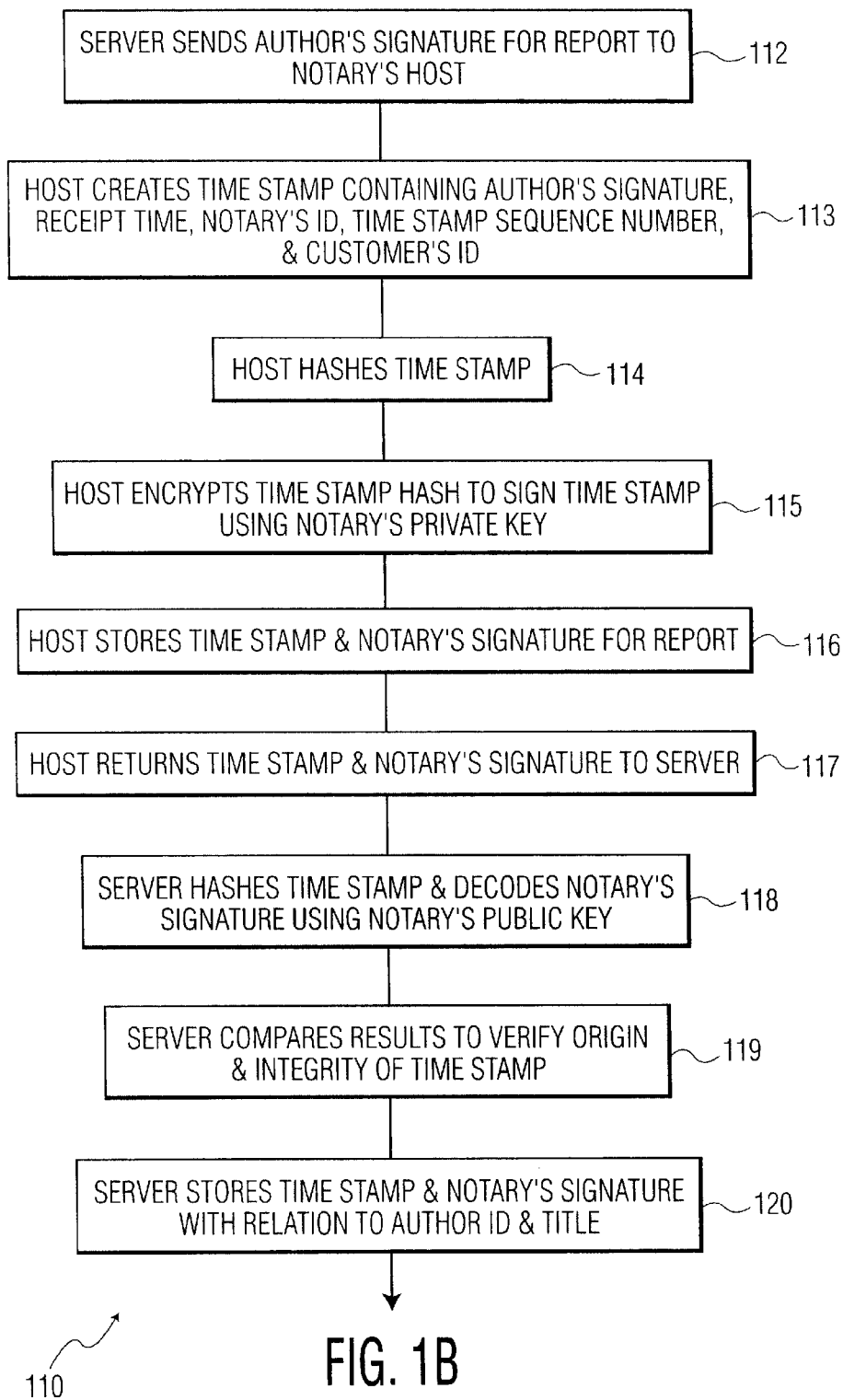

In a next group of steps 110 in FIG. 1b, the server obtains a time stamp for the report, and stores the time stamp with relation to the report. In step 112, the server sends the author's signature to a notary's host system over the network. Alternately, the notary could be a secure part of the hardware of the server, for example, with a private password that the owner of the server would not know or be able to discover without destroying the device. Since the signature in not confidential, high security is not required for signature transmission. In step 113, the host creates a time stamp containing the author's signature, receipt time, notary id, sequence number, and customer id. In step 114, the notary hashes the time stamp. In step 115, the notary signs time stamp hash using the notary's private key. In step 116, the notary stores the time stamp and the notary's signature. In step 117, the notary returns to the server, the time stamp and the notary's signature. Also, after the next one or more time stamps are produced they are sent in a package to the server so that by contacting the customers identified in the time stamps the approximate time of the time stamp can be independently verified. In step 118, in order to verify notary's signature, the server hashes the time stamp and decrypts notary's signature using notary's public key. If there is a match then the time stamp is verified. In step 119, the server stores the previous time stamp, time stamp notary's signature, and any previous and/or subsequent time stamps with relation to the report.

Figure 1C:
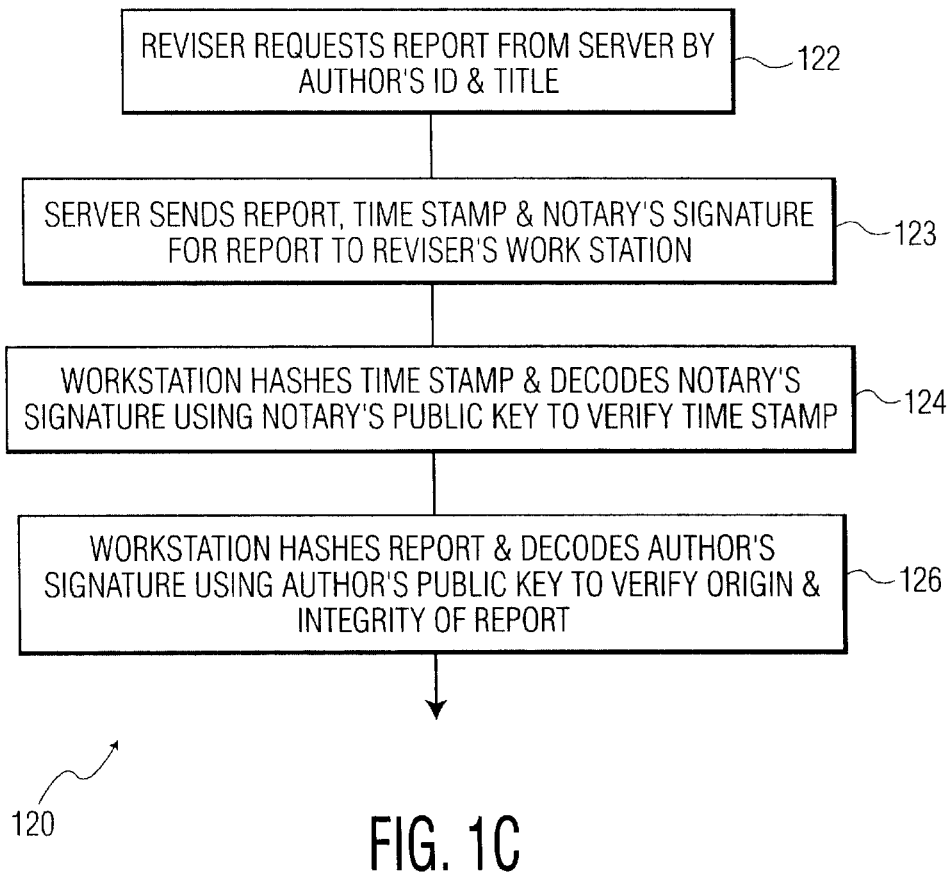

In the next group of steps 120 in FIG. 1c, a revisor creates a revision of the report and submits it to the server. In step 122, a reviser requests the report from server. There are many situations in which someone may need to revise a document such as to add additional materials or to correct errors. Preferably, the revisor tells the server that he plans to revise the report and the server thereafter refuses to transmit the report to anyone else who asks for the report for revising the report (i.e. the report is locked out for revision until the revisor provides the revision or otherwise releases the lock). In step 123, the server sends the report, the report time stamp and notary's signature to reviser's workstation. In step 124, the revisor's workstation hashes the report and decrypts the author's signature using the author's public key to verify the author's signature. That is, if the hash and the decryption of the signature match then the revisor knows that the document was submitted by the author. In step 125, the workstation hashes the time stamp and decrypts the notary's signature using notary's public key to verify report time. That is, if the hash and the decryption of the notary's signature match then the time stamp is from the notary and the timestamp is correct.

Figure 1D:
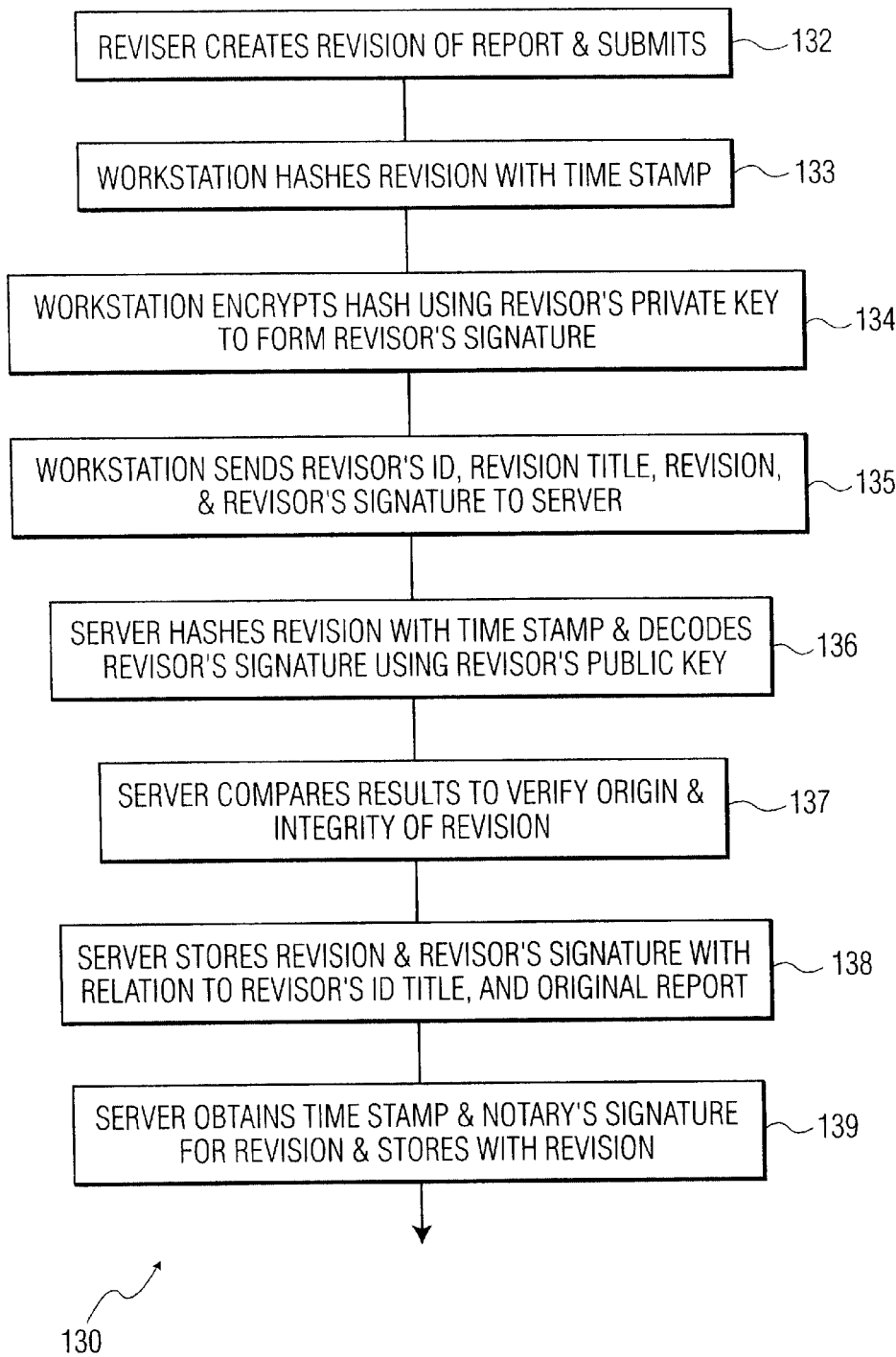

In the final group of steps 130, in FIG. 1d, a revisor obtains a copy of the revised report and authenticates its origin, the time of its creation, that it is related to the original image and that it was created at a certain time. In step 132, the reviser creates a revision of the report and inputs a command to submit the revision to the server. In step 133, the workstation combines the revision and the previous time stamp, and in step 134, the workstation hashes the combination. In step 135, the workstation encrypts the hash using the revisor's private key to form revisor's signature. In step 136, the workstation stores the revision, the hash and the revisor's signature. In step 137, the workstation sends the revision, and revisor's signature to the server. In step 138 the server hashes the revision and decodes the revisor's signature using revisor's public key to verify the revisor's signature. In step 139, the server combines the revision with the previous certification, and in step 140, the server hashes the combination and decrypts revisor's signature using revisor's public key to verify revisor's signature. If the resulting hash and the decryption of the revisor's signature match then the server knows that the revisor claims that the report has been revised and the revisor had the correct report and revision has not been changed since the revisor signed it. In step 141 the server stores the revision and the revisor's signature with relation to report. In step 137, the server obtains a time stamp for the revision and stores time stamp with relation to revision. This is the same process for the revision as described above in steps 112–119 for the report. After this future revisions will be made from which ever revision is the current revision.

FIGS. 2a–2d shows another specific embodiment of the invention for authenticating revisions. In a first group of steps 160 in FIG. 2a, the author creates an image and transfers the image to a server which signs the image for the author and stores the image. In step 162, the author operates an imager to create and submit an image. The imager may be any equipment that produces an image such as a business page scanner, medical scanner (electro-cardiogram, computerized axial tomography, X-ray scanner), a video image and/or an audio image. In step 163, the imager transmits the image to the server over a secure link. In step 164, the server hashes the image, and in step 165, the server combines a scanner ID or author ID and the image hash. One way of combining would be to append the ID to the hash, another way of combining would be to append the ID to the image and hash both together. Alternately, the imager or author could have specific private/public password pairs that could be used to prove the origination of the image so the imager ID or author ID would not have to be combined with the image hash. In step 166, the server encrypts the combination using the server's private key to form an image signature. In step 167, the server stores the imager ID (or author ID), the image hash and server's image signature relationally.

Figure 2A:
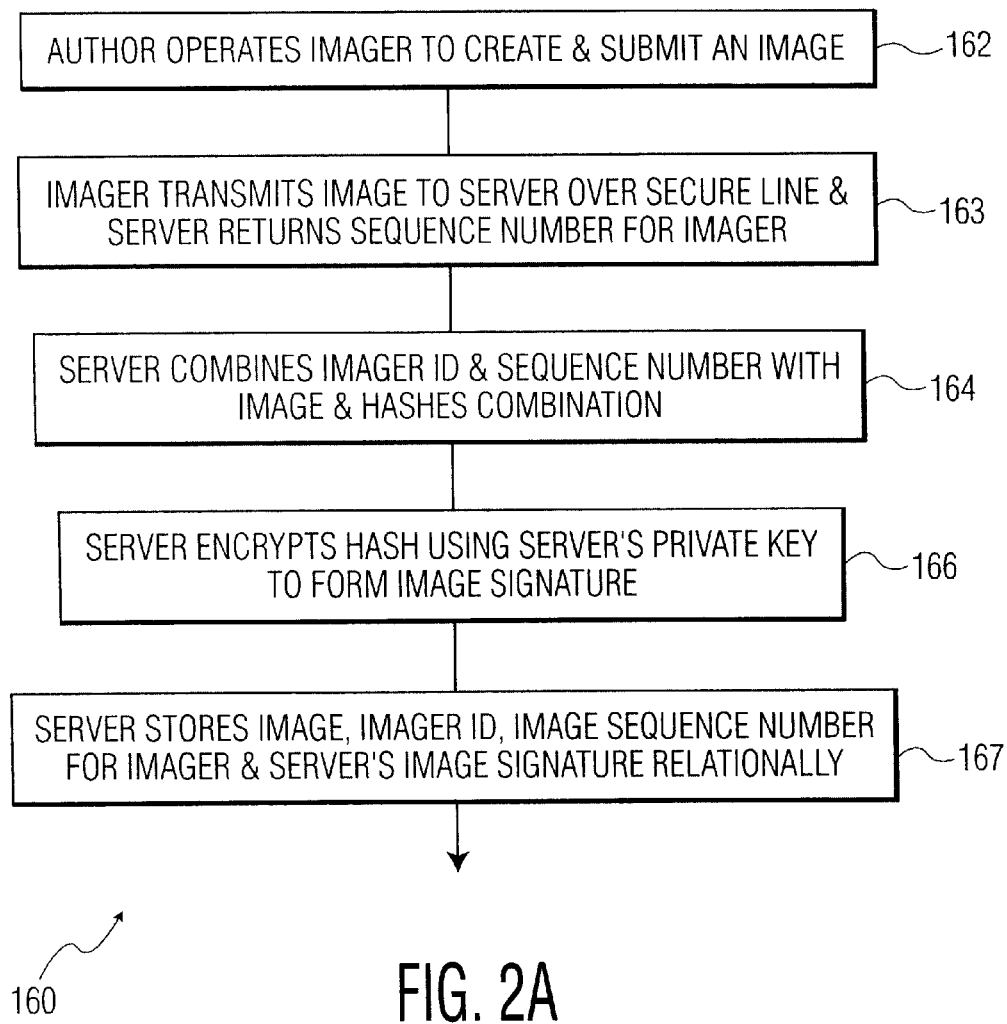
FIGS. 2a–2d shows another flow chart of another specific embodiment of the invention for authenticating revisions.
Figure 2B:
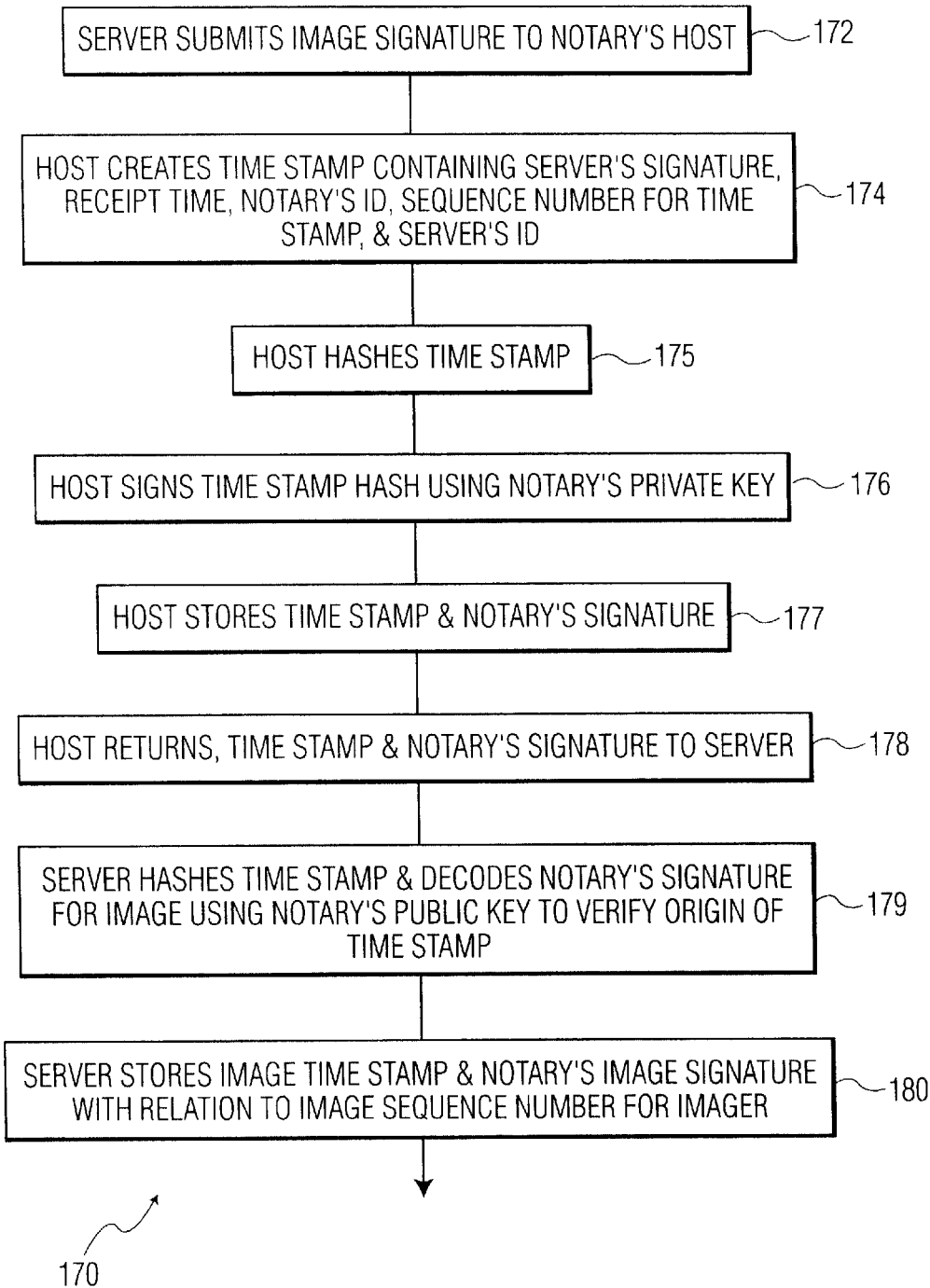

In the next group of steps 170 in FIG. 2b, the server obtains a timestamp time stamp and a time stamp signature from a notary. In step 172, the server establishes a connection with notary's host, and in step 173, the server sends the server's image signature to the host. In step 174, the host creates a time stamp containing the server's signature, the receipt time, the notary id, the sequence number, and the server id. In step 175, the host hashes the time stamp. In step 176, the host signs the time stamp hash using the notary's private key. In step 177, the host stores the time stamp and the notary's signature. In step 178, the host transmits the time stamp and notary's signature to the server. In step 179, the server hashes the time stamp and decodes the notary's signature for the image using the notary's public key to verify the notary's signature. In step 180, the server stores the image time stamp and the notary's image signature with relation to image hash.

Figure 2C:
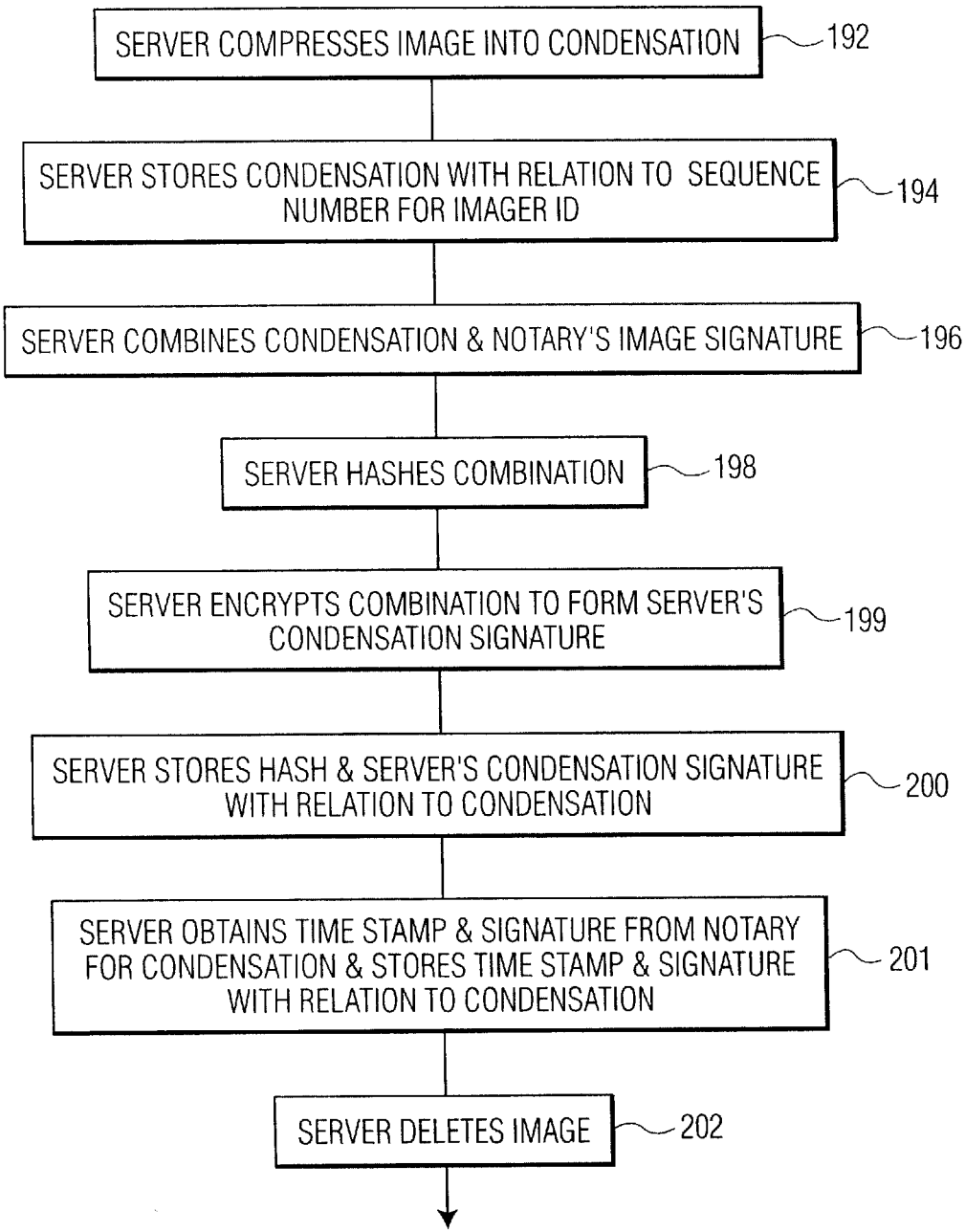

In the next portion of steps 190 in FIG. 2c, the server automatically revises the image and obtains a time stamp for the revision. In step 192, the server compresses the image into a lossy condensation. For example a bit image is compressed into a bit reduced image by JPEG compression, an audio image is compressed using MPEG-2 or Dolby AC3, or a video may be compressed using MPEG-2. In step 194, the server stores the condensation with relation to the image hash. In step 196, the server hashes condensation, and in step 198, the server combines the condensation hash and the notary's image signature, for example, by appending them together or more preferably by appending the image signature to the image and hashing them together in step 196. In step 199, the server encrypts the combination to form the server's condensation signature, and in step 200, the server stores the hash and server's condensation signature with relation to condensation. In step 201, the server obtains a time stamp from the notary for the servers condensation signature and stores the time stamp with relation to condensation. In step 202, server deletes image. This may be required because uncompressed images especially of video may require 100 times as much storage as compressed video, and such large amounts of storage may not be available or affordable by the customer.

Figure 2D:
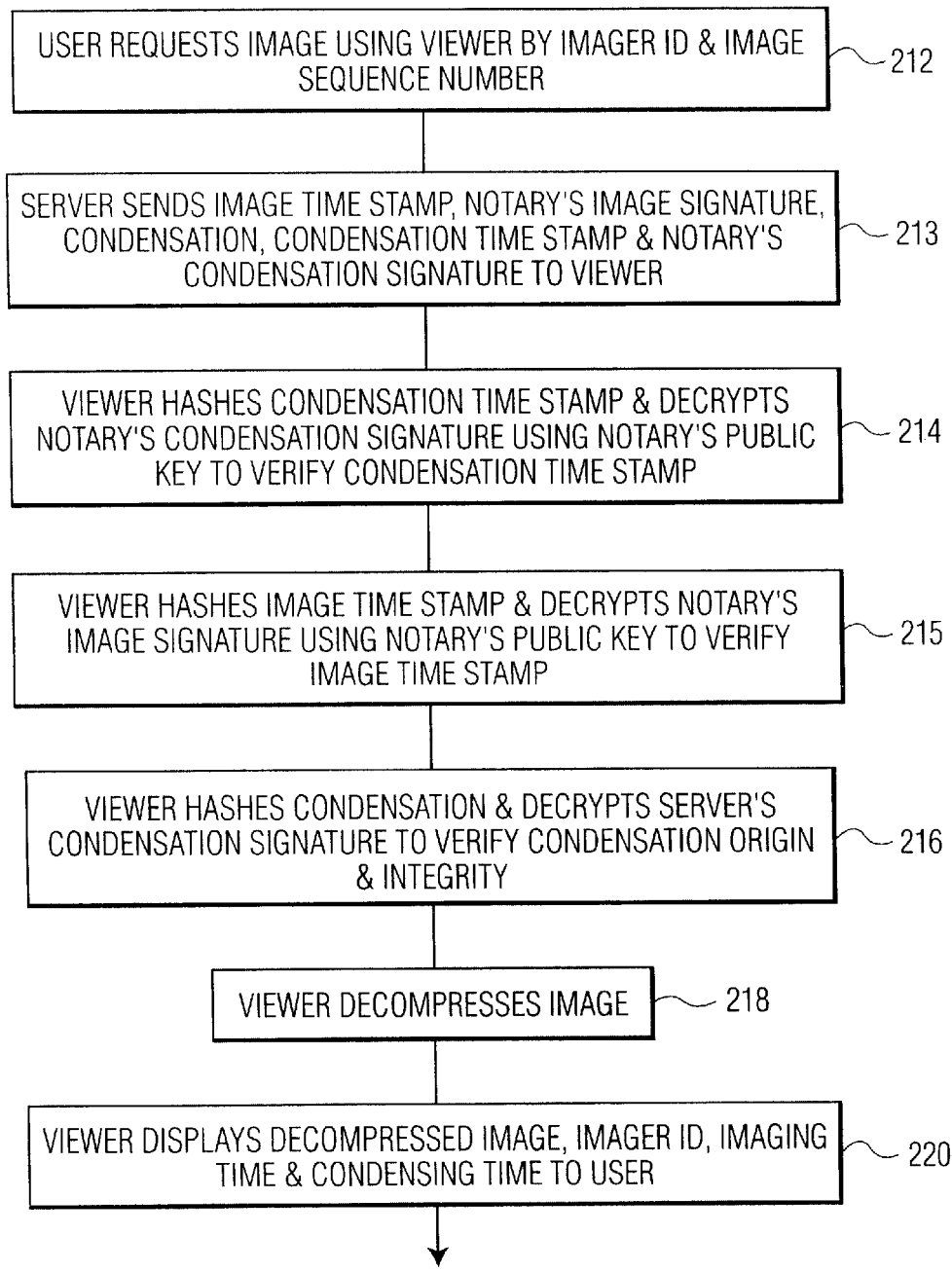

In the final set of steps 210 in FIG. 2*d*, a user requests the image for viewing on a viewer and the stored image is provided along with the two time stamps and the two notary's signatures s that the viewer can verify the origin and certification date of the original image and the origin and certification date of the revision and that according to the server the revision is a product of the original image. In step 212, the user requests the image using the viewer. The viewer may be any equipment that allows the image to be played to the user. The viewer is not restricted to visual display and may be, for example, a loud speaker playing an audio image. In step 213, the server sends the image hash, the imager id, the image condensation, both related time stamps (one for the image and one for the compressed image) and similarly both notary's signatures to the viewer. In step 214, the viewer hashes the condensation time stamp and decrypts the notary's signature for the condensation using the notary's public key in order to verify the digital time and other information in the condensation time stamp. In step 215, the viewer hashes the image time stamp and decrypts the notary's image signature using the notary's public key to verify the image time stamp. In step 216, the viewer hashes the condensation, and in step 217, the viewer combines the condensation hash and the notary's image signature and decrypts the servers's condensation signature to verify the condensation time stamp including the condensation time. In step 218, the viewer combines the image hash and the imager id and decrypts the server's image signature to verify the imager id and imaging time. In step 219, the viewer compares the image time stamp time and the condensation time stamp time to verify that the times are very close. In step 220, viewer displays the image, imager id, imaging time and condensing time to the user.

Figure 3A:
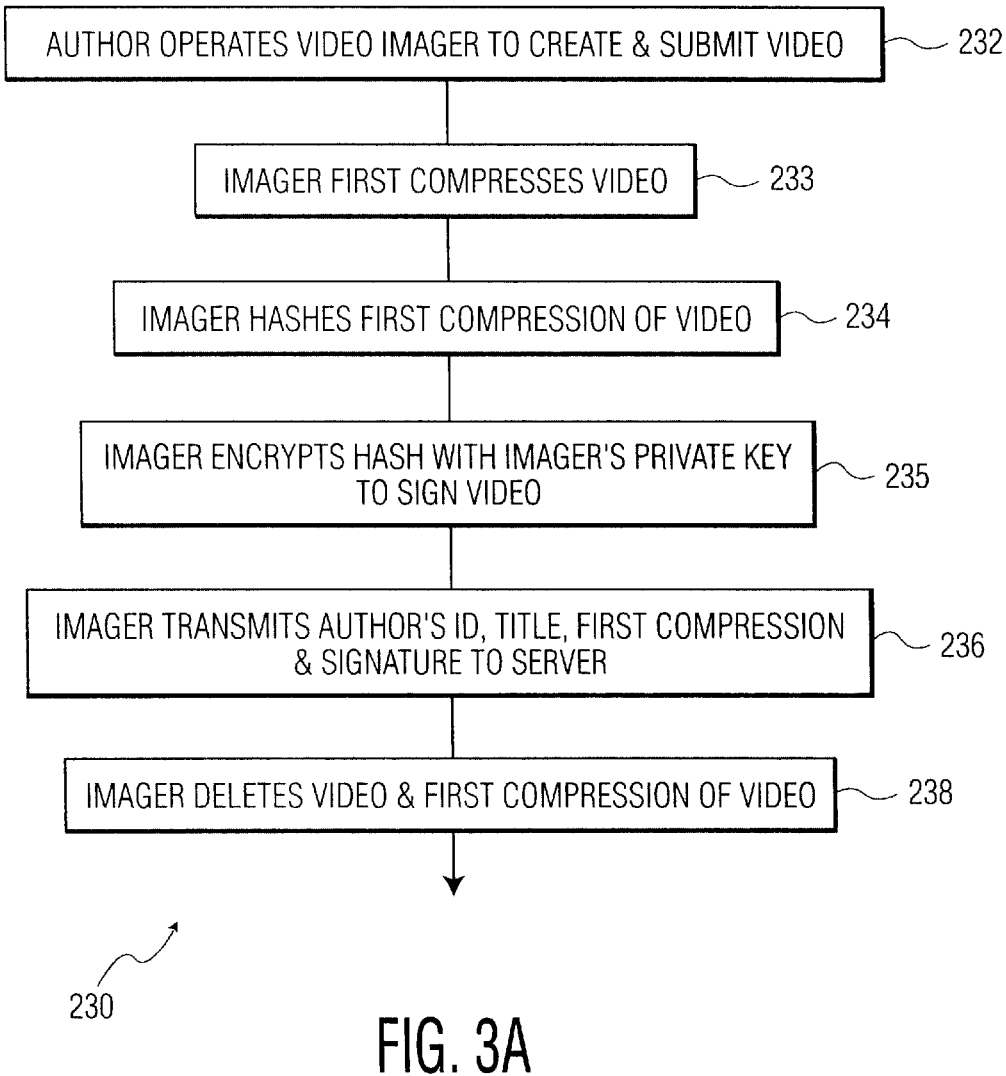
FIG. 3 shows a sample embodiment of the system of the invention.
Figure 3B:
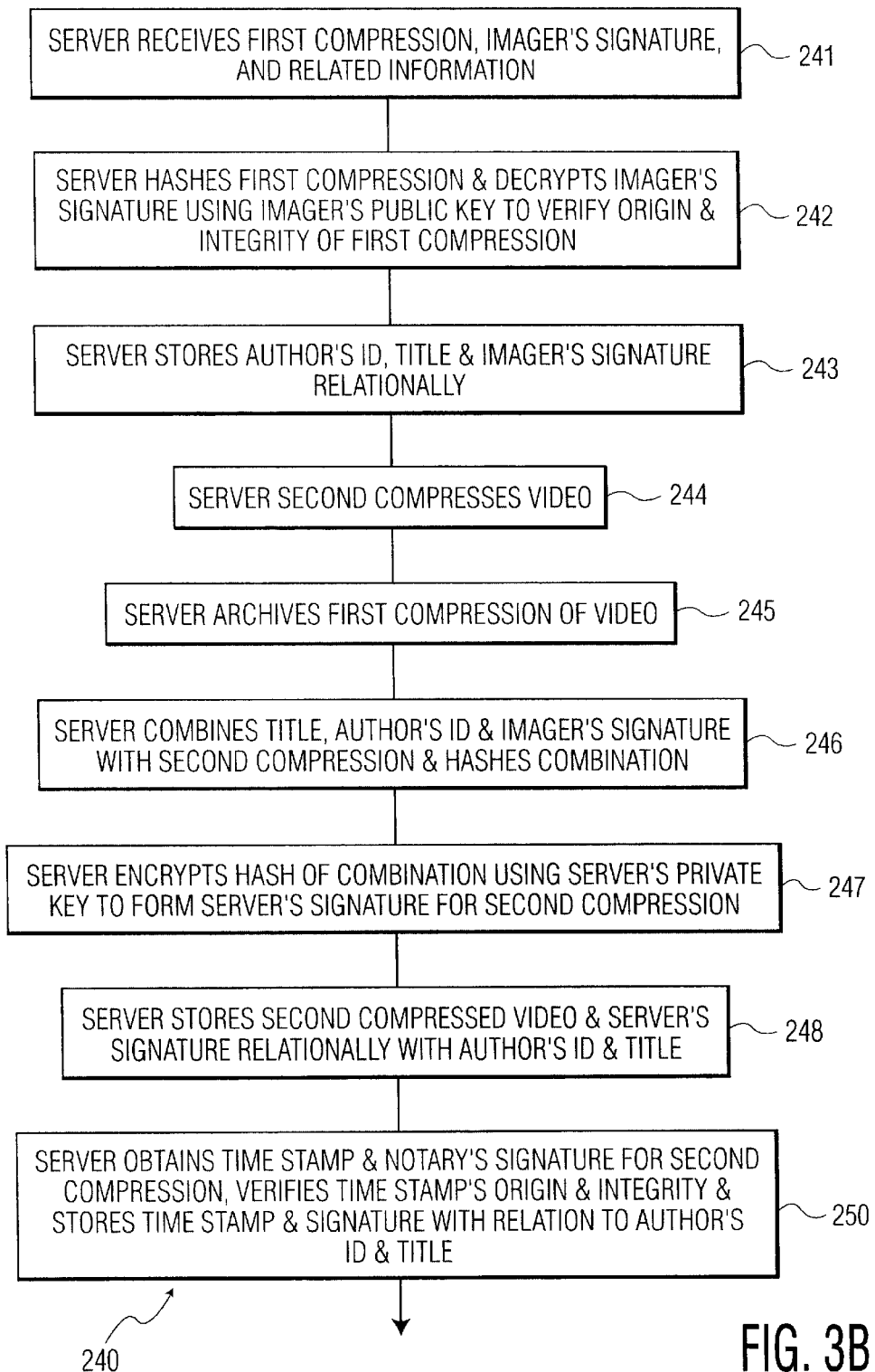
Figure 3C:
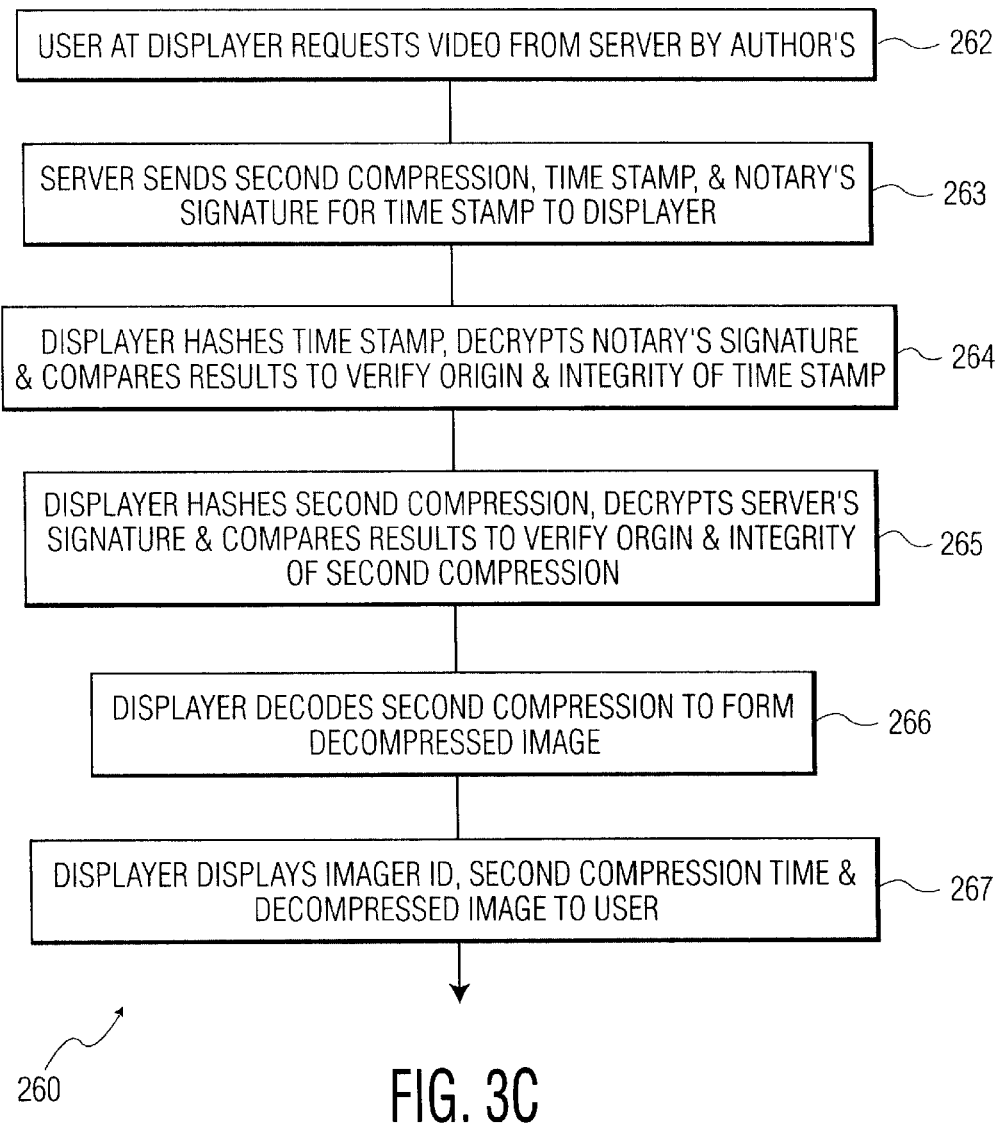

FIGS. 3*a*–3*c* illustrate another embodiment of the invention where a server immediately compresses a video upon receipt and obtains a time stamp for the respective receipt of the video and compression. In a first group 230 of steps in FIG. 3*a*, the video is created and transmitted to the server. In step 232, the author operates the video imager to create the video and to submit the video to the server. The imager may be any equipment for creating multimedia presentations such as a video camera and microphone. The video may include sound channels and other data as will as video images. In step 233, the imager first compresses the video. For example, the imager may transmit the video in motion MPEG or similar simple lossless or lossy compression methods. In step 234, the imager hashes the first condensation of the video. In step 235, the imager encrypts the hash with the imager's private key to sign the video. In step 236, the imager stores the hash and signature. In step 237, the imager transmits the first condensation and signature to server. In step 238, the imager deletes the video and first condensation of the video. Alternately the first condensation could be archived at the imager, but generally it is more convenient to archive at the server as described below. In step 239, the server hashes the first condensation of the video and decrypts the video imager's signature using the imagers' public key to verify the first condensation. In step 240, the server stores the imagers's signature and the hash of first condensation video relationally. In step 241, the server second compresses the video. In step 242, the server archives the first condensation of the video.

In a second set of steps 250, in FIG. 3*b*, the server obtains a time stamp and time stamp signature from a notary. In step 252, the server hashes the second condensation. In step 253, the server combines imager's signature and hash of second condensation. In step 254, the server encrypts the combination using the server's private key to form the server's video signature for the second compressed video. In step 255, the server stores the second compressed video and the server's video signature relationally with the imager's signature. In step 256, the server obtains a time stamp and the notary's signature from the notary for the server's video signature, verifies the time stamp and stores the time stamp with relation to the second condensation.

In a final group of steps 260 in FIG. 3*c*, a user requests to view a display of the video. In step 262, the user at the displayer requests the video from the server. In step 263, the server sends the hash of first condensation, the video imager's signature, the second condensation, the time stamp, and the notary's signature to the displayer. In step 264, the displayer hashes the time stamp and decrypts the notary's signature using the notary's public key to verify the time stamp. In step 265, the displayer hashes the second condensation. In step 266, the displayer combines the second condensation hash and the imager's signature, and decrypts the servers's signature to verify the time and origin of second condensation. In step 267, the displayer decrypts the imager's signature and compares it with the first condensation hash to verify origin of the first condensation. Finally the user views the video on the displayer.

Figure 4:
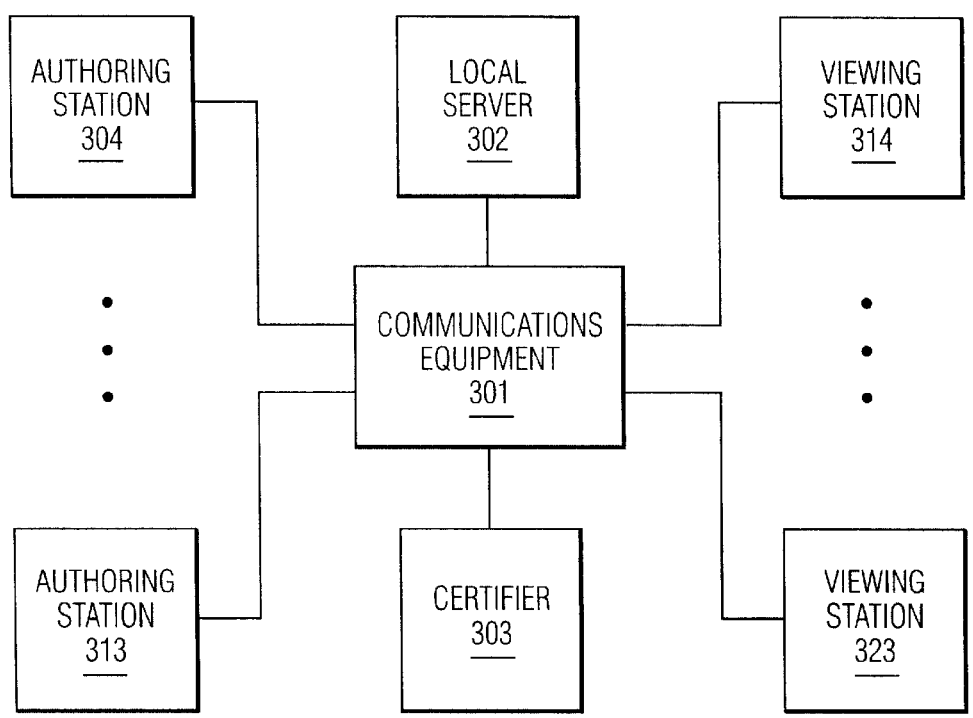
FIG. 4 shows a specific embodiment of apparatus to program the system of FIG. 3.

FIG. 4 illustrates a network 300 of the invention in which a multitude of computer nodes are connected together by a communications network of cables and communications equipment 301. The network nodes include a local server 302 and a notary 303. A multitude of authoring stations 304–313 connected through the communications network with the server, and a multitude of viewing stations may also be connected to the server through the communications network. The authoring stations have equipment for creating documents such as X-rays, test data, scans, video and audio images, and apparatus for transmitting the documents to the server, and requesting documents from the server and revising such documents. Viewing stations 314–323 are primarily for requesting digital documents from the server and viewing the documents but may also have some limited facilities for revising the documents such as adding notes and comments.

Figure 5:
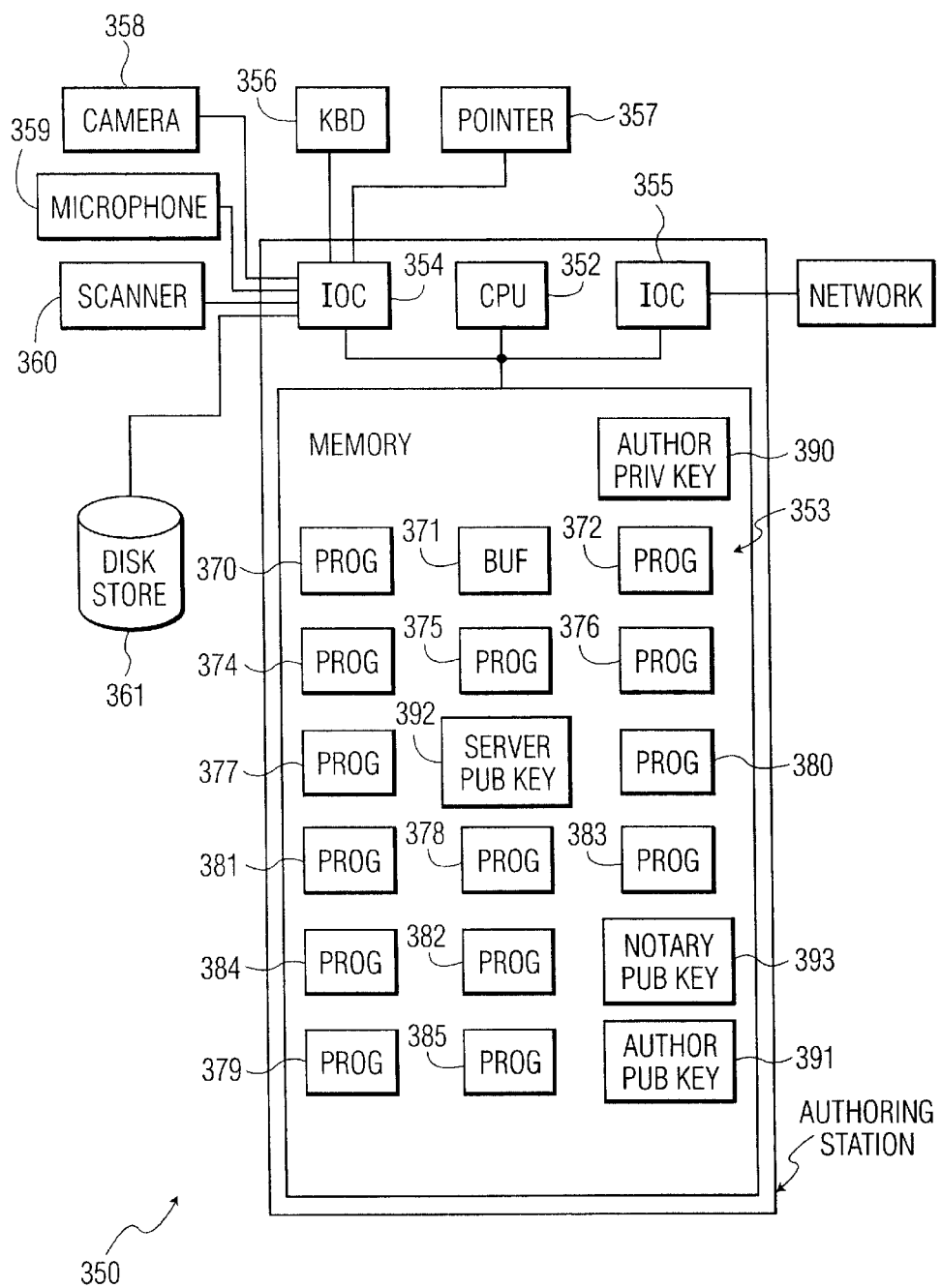
FIG. 5 illustrates additional details of the authoring station 304 shown of FIG. 4.

In FIG. 5, additional details of authoring station 304 in FIG. 4, are shown. The authoring station includes a processor 352 such as a central processing unit (CPU) or an embedded controller, communicating with an electronic memory 353. The memory includes programs which control the operation of the processor and buffers for storing information received through an input and/or output (I/O) circuit 354 (IOC) from authoring peripherals and for transmitting and receiving information from other nodes of the network through IOC 355. The peripherals may include, for example, keyboard 356, mouse 357, video camera 358, microphone 359, scanner 360, and disk storage 361. The memory includes program module 370 for interacting with a user to produce a document which is stored in buffer 371 and to initiate the process for sending the document to the server. The memory includes program module 372 to one-way hash the document and to encrypt the hash using a private key of the user or of the station to provide a digital signature for the document. The memory may also include a module 373 to transmit the document, the one-way hash or the signature to the server. Program module 374 may be used to store the document, hash, or digital signature into storage 361. For video images, the memory includes a program module 375 to encode the video into a compressed form such as motion JPEG, or MPEG-2 video and store the compression of the video as another document in buffer 371.

The authoring station may also be used for revising documents to produce revisions which may be returned to the server. Program module 370 may be used to request a document from the server. Program module 376 negotiates the receipt of the document and related time stamps and other information from the server, and program 377 authenticates the documents. In one embodiment of the invention described above, in addition to the document, the revising station receives a time stamp with a digital time and a notary's signature. Module 377 includes apparatus to hash the time stamp and decrypt the notary's signature using the notary's public key and compare the results to determine the origin of the time stamp and that the contents of the time stamp including the digital time have not been altered. Then program 377 hashes the document and decrypts the server's (or author's) signature (contained in the time stamp) and compare the results to determine if the server's signature is for the document and verify that the document has not been changed since it was signed by the server. Furthermore, if the document is a revision, then the server may also transmit, and module 377 receive, a hash of the original document, the server's (or revising author's) signature for the revision another time stamp and notary's signature for the original document, and module 377 can again authenticate the time stamp and then decrypt that the server's signature (contained in the time stamp) and compare the results to the hash of the original document to verify the origin of the document. Also, in some of the above embodiments information such as the revisor's signature or a previous notary's signature are combined with the hash of the document to form the server's signature, and in those cases module 377 will have to compare the decrypted signature with the appropriate combination of items.

Figure 6:
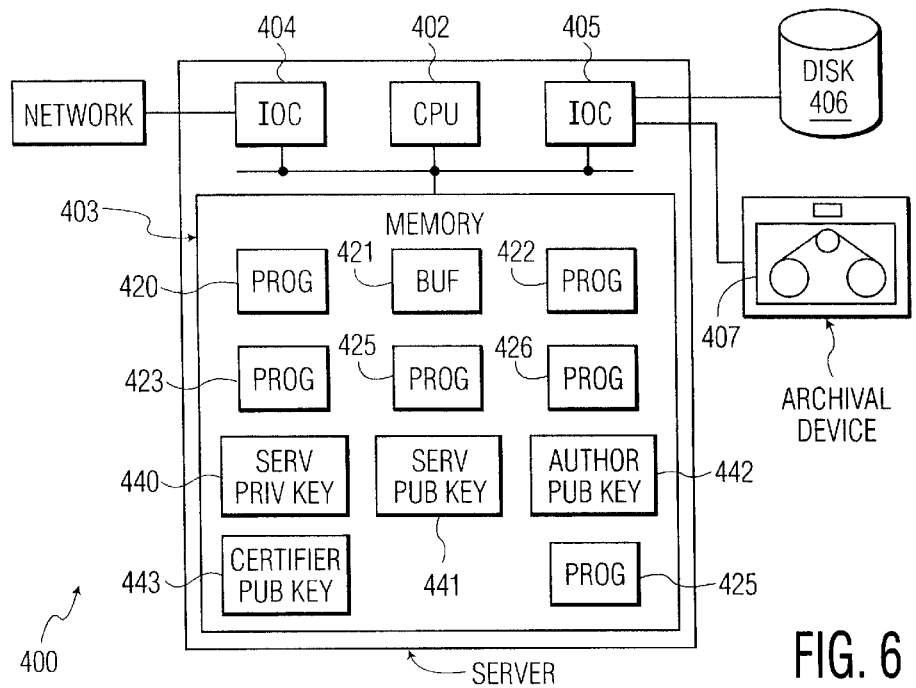
FIG. 6 shows additional details of the server 302 shown of FIG. 4.

In FIG. 6, additional details of server 302 in FIG. 4, are shown. The server includes a processor 402 such as a central processing unit (CPU) or an embedded controller, communicating with an electronic memory 403. The memory includes programs which control the operation of the processor and buffers for storing information received from the network and information being sent onto the network through an input and/or output (I/O) circuit 404 (IOC). IOC 404 is for transmitting information to and receiving information from other nodes connected to the network. The server may be a gateway server for example being connected to local clients through one IOC in a network and connected to other servers and/or remote clients in another network. IOC 405 is used for storing information onto disk storage 406 and for sending information to archival storage device 407 and occasionally for retrieving the archived information.

The memory includes program module 420 for controlling the receiving of information and transmission of information through IOC 404 with the other nodes in the network. Program 420 copies the documents from the network into portions of buffer 421 and copies information from portions of buffer 421 onto the network. In some of the above embodiments, the server receives a digitally signed document from an authoring station. In such case, program module 422 performs a one-way hash on the document, decrypts the digital signature and compares the result to verify that the document has not been changed since it was digitally signed and that the origin of the document is correct. In another of the embodiments above, the server receives a document which is not signed. In such case program module 423 hashes the document and encrypts the hash using either the server's private key or the originator's private key (which is kept on the server). In another of the embodiments, a revisor signs a document by hashing the revision, and with such hash, combining a hash of the previous document, the previous author's signature, the previous time stamp, or the previous time stamp signature, and signing the combination. Thus, the signature identifies not just the revision, but also the original document from which the revision was derived. The reviser then sends the server the document and (assuming that the server knows what was combined to create the signature). In such a case module 423 decrypts the signature, hashes the document, combines the hash with the same thing the reviser combined with the hash, and compares the results to verify the origin of the revision and original documents and that the revision has not been altered since signing. If the server receives an unsigned revision, then module 423 may hash the revision, if desired, combine the hash with some indication of the origin of the original document (a hash of the previous document, the previous author's signature, the previous time stamp, or the previous time stamp signature), and then module 423 signs the document using either the server's private key or the originator's private key. Regardless of how the document was signed, module 424

In one of the above embodiments, the server receives a document, (if it is not signed then program 423 signs the document), obtains a time stamp for the document, automatically revises the document, hashes the revised document, combines the hash with some indication of the origin of the original document, signs the combination and obtains another time stamp for the automatic revision. In another of the above embodiments, module 423 receives a document, signs the document if required, automatically revises the document, hashes the revised document, combines the hash with the signature of the original document, signs the combination, and obtains a time stamp for the combined signatures for the revision and automatic revision.

After the document is signed then program module 424 sends the signature to a notary who creates a time stamp containing the signature and a digital time, signs the time stamp and who returns the time stamp and time stamp signature which are received by module 424. Then module 424 hashes the time stamp and decrypts the digital signature to verify that the time stamp is from the identified notary and that the time stamp has not been changed since it was signed.

For revised documents, in order to save space on random access storage 406 (hard disk, DVD, CD-ROM), program module 425 copies old versions of documents onto removable computer media (e.g. tape) which is removed from the server, in a process known as archiving. If an archived document is requested then program 425 is responsible to get the archive moved into the archival storage system 407 and to restore the required files back onto the server.

Figure 7:
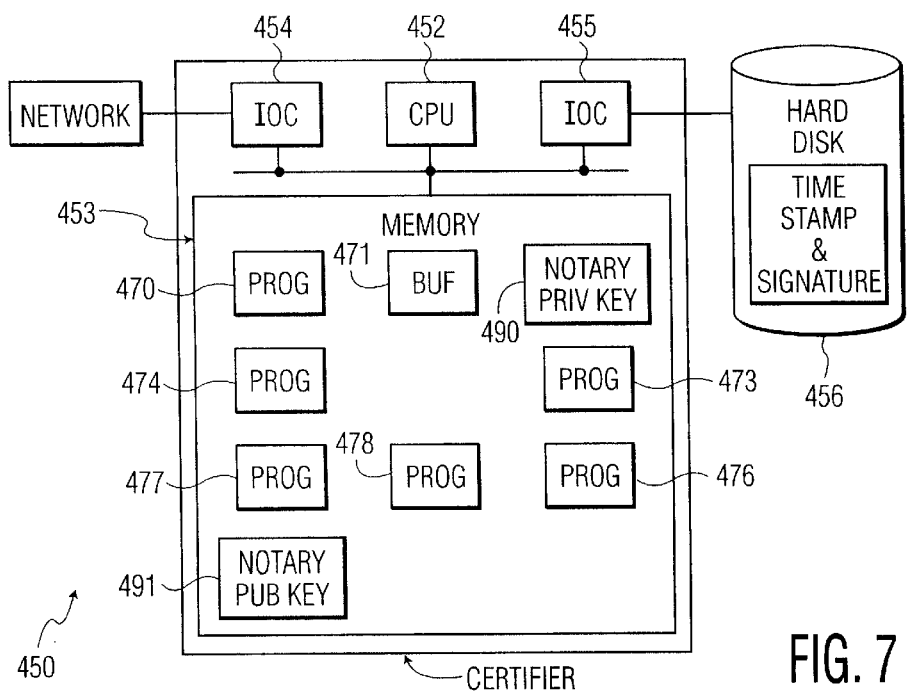
FIG. 7 depicts additional details of certifier 303 shown in FIG. 4.

In FIG. 7, additional details of notary 303 in FIG. 4, are shown. The notary includes a processor 452 such as a central processing unit (CPU) or an embedded controller, communicating with an electronic memory 453. The memory includes programs which control the operation of the processor and buffers for storing information received from the network and information being sent onto the network through an input and/or output (I/O) circuit 454 (IOC). IOC 454 is for transmitting information to and receiving information from other nodes connected to the network. IOC 455 is used for storing the time stamps and time stamp signatures on disk 456.

The memory includes program module 470 for controlling the receiving of document signatures and transmission of time stamps and time stamp signatures. Program 470 copies the document signatures from the network into portions of buffer 471 and copies time stamps and time stamp signatures from portions of buffer 471 onto the network. Program module 472 reads the signature from the buffer and creates a time stamp containing the signature, the time the signature was received (in any time format), and preferably a sequence number. Then module 472 hashes the time stamp and encrypts the hash with the notary's private key to form a digital signature. Then module 472 copies the time stamp and the signature into buffer 471 and initiates module 470 to transmit the time stamp and time stamp signature of the notary back to the customer. Program module 473 copies the time stamp and time stamp signature through IOC 455 onto hard disk drive 456.

Figure 8:
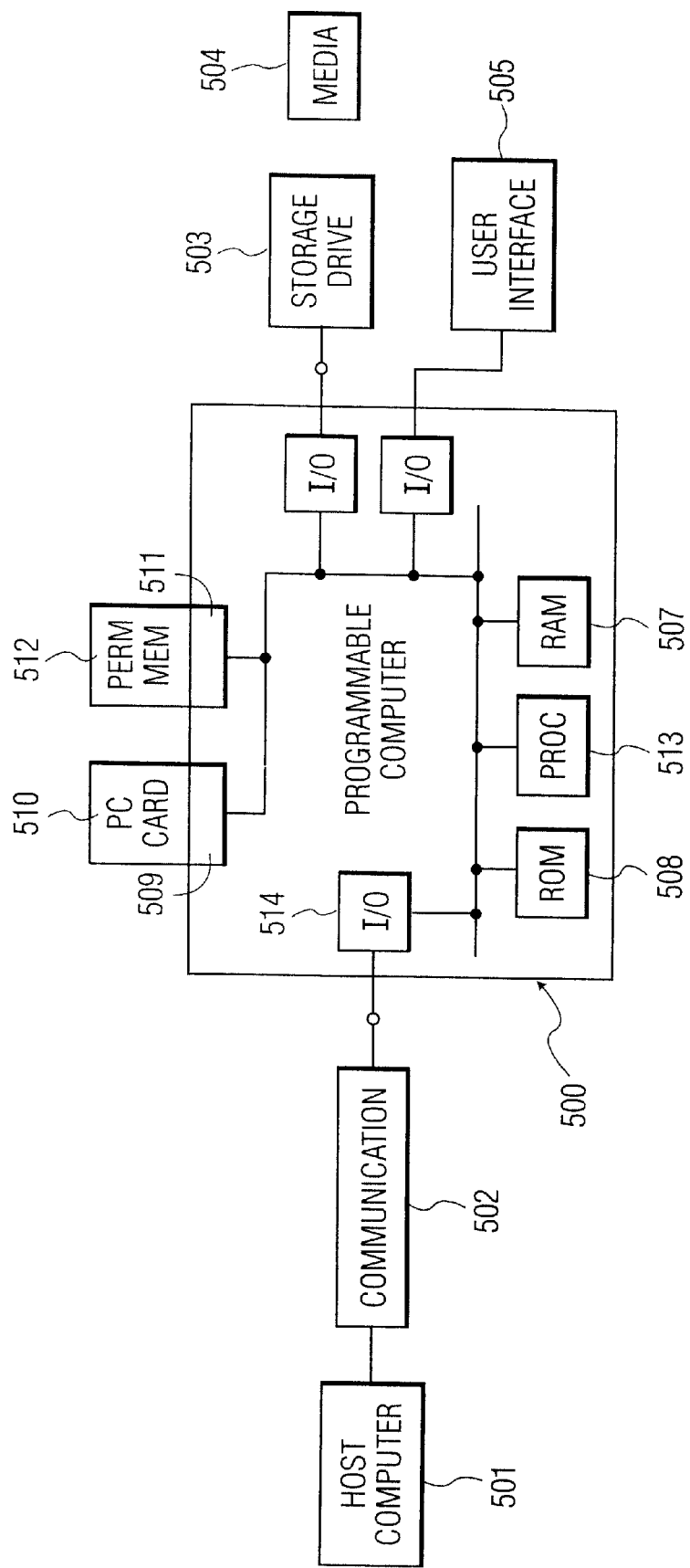
FIG. 8 illustrates a computer that may be programmed to implement a portion of one of the authoring station, local server, certifier and viewing station of FIG. 4.

FIG. 8 illustrates a programmable computer system 500 and various example apparatus for programming such programmable computer which are all well known in the art. The computer system may be programed either by connecting non-volatile memory (e.g. ROM, PROM, EEPROM, flash memory, battery backed SRAM) containing programmed structures to the programmable computer or by providing signals to the programmable computer which may be applied to memory of the programmable computer to provide programmed structures. Another computer system 501 such as an Internet server may be connected through a communication apparatus 502 to system 500 to provide signals for programming system 500. Apparatus 502 may include a copper or optic cable, radio, infrared, or network such as Ethernet, ARCnet, Token ring, or a modem and telephone system. A storage drive 503 may have integral media 504 and be removably attached to system 500 or drive 503 may be integral with system 500 and receive signals from removable computer media 504. System 500 may include a user interface 505 and program input module 506, and written materials may be provided. A user may input the signals using apparatus (not shown)of the user interface such as a keyboard, text scanner, microphone, camera or bar code reader. The signals provided to system 500 may be copied to storage drive 503 for later recall into volatile memory 507 or stored in non-volatile memory 508 to provide programed apparatus in memory. Alternately the system may be programmed by providing programmed non-volatile memory. System 500 may include a slot 509 into which a cartridge 510 containing non-volatile memory such as a PC flash memory card, may be connected to provide programed apparatus. System 500 may include a socket 511 into which a non-volatile package 512 may be inserted to provide programmed apparatus. System 500 may be fabricated with non-volatile integral memory 508 to provide programmed apparatus. The programmed structures include programs and other data in memory which control a micro-processor 513 and I/O processors e.g. 114 of the programmable computer to implement computer processes. The computer system may be a workstation, modem, PC card, printer, or other software upgradable component. Other well known methods of programming a computer system may also be used.

The invention has been described with reference to specific embodiments including the best mode for carrying out the invention, and with sufficient detail that anyone skilled in the art-can make and use the invention. Those skilled in the art may modify these embodiments or provide other embodiments within the spirit of the invention, and thus, the description does not limit the present invention to the disclosed embodiments. The invention is limited only by the following appended claims.

I claim:

1. A computer network, comprising:
   a first computer system providing access to a user, including:
      means for providing a first digital-document;
      signing means for deriving a first digital-fingerprint from the first digital-document document, the first digital-fingerprint being a smaller different and separate or separable digital-document from the first digital-document; and
      first transmitting means for transmitting the first digital-fingerprint;
   a second computer system that is secure from direct access by the user, including:
      first receiving means for receiving the first digital-fingerprint from the first system;
      timestamping means for producing a first digital-timestamp and containing a first digital-time of the first digital-timestamp and the first digital-fingerprint; and
      second transmitting means for transmitting the first digital-timestamp to the first system;
   the first system further comprises:
      second receiving means for receiving the first digital-timestamp from the second computer system;
      first storing means for storing the first digital-timestamp; and
      means for revising the first digital-document to produce a second digital-document independent of the first digital-timestamp;
   and wherein:
      the signing means derive a second digital-fingerprint from both the second digital-document and an indicator of the first digital-document to provide evidence that the second digital-document is a revision of the first digital-document, the indicator including at least a portion of the first digital-timestamp;
      the first transmitting means transmit the second digital-fingerprint to the second computer system, the second computer system being secure from access by users who produce the second digital-document, or who initiate deriving the second digital-fingerprint or who initiate transmitting the second-digital-fingerprint;
      the first receiving means of the second system receives the second digital-fingerprint from the first system;
      the timestamping means produces a second digital-timestamp containing a second digital-time of the second timestamp and the second digital-fingerprint;
      the second transmitting means transmits the second digital-fingerprint to the first system;
      the second receiving means of the first system receives the second-timestamp from the first system; and the storing means stores the second digital-timestamp;

the computer network further comprising:
means for authenticating digital-timestamps, the authenticating including determining whether the digital-timestamps were produced on the second system and whether the digital-timestamps have been altered since they were produced;
means for authenticating digital-documents depending on authenticating the digital-timestamp for the digital-document and from the second digital-fingerprint contained in the second digital-timestamp; and means for verifying that the second digital-document is a revision of the first digital-document depending on the portion of the first digital-timestamp from which the second digital-fingerprint was derived.

2. The network of claim 1 further comprising:
means for authenticating digital-documents depending on authenticating the digital-timestamp for the digital-document and from the second digital-fingerprint contained in the second digital-timestamp; and
means for verifying that the second digital-document is a revision of the first digital-document depending on the portion of the first digital-timestamp from which the second digital-fingerprint was derived;
and in which the authenticating means includes:
a private-key for encrypting data in the second system the private-key being secure from access by the user;
a public-key in the first system for decrypting the encrypted data that was previously encrypted using the private-key;
second signing means for producing respective digital-signatures from the digital-timestamps by encryption using the private-key in the second system;
means for decrypting the digital-signatures for the digital-timestamps using the public-key to re-produce the respective digital-timestamps on the first system; and
means for comparing the respective transmitted digital-timestamps and re-produced digital-timestamps on the first system to determine whether the digital-timestamps are authentic;
and in which:
the second transmitting means transmit the digital-signatures for the digital-timestamps to the first system; and
the second receiving means receives the digital-signatures for the digital-timestamps in the first system.

3. The network of claim 1, further comprising:
means for authenticating digital-documents depending on authenticating the digital-timestamp for the digital-document and from the second digital-fingerprint contained in the second digital-timestamp; and
means for verifying that the second digital-document is a revision of the first digital-document depending on the portion of the first digital-timestamp from which the second digital-fingerprint was derived;
and in which the authenticating means include:
second storing means for storing the digital-timestamps on the second system the second storing means being secure from direct access by the user;
means to retrieve the digital-timestamp from second storage into the second system;
means to compare the retrieved digital-timestamp and transmitted digital-timestamp, in the second system; and
means to transmit an authentication signal or authentication failure signal from the second system to the first system, depending on the comparison;
and in which the first transmitting means transmit the digital-timestamps from the first system to the second system.

4. A method of operating a computer network, comprising the steps of:
providing a first digital-document on a first computer system access to a user;
deriving a first digital-fingerprint from the first digital-document on the first system;
transmitting the first digital-fingerprint from the first system to a second computer system that is secure from direct access by the user;
creating a first digital-timestamp including the first digital-fingerprint and a first digital-time;
transmitting the first digital-timestamp from the second system to the first system;
revising the first digital-document to produce a second digital-document;
deriving a second digital-fingerprint from the second digital-document and from an indicator of the first digital-document to provide evidence that the second digital-document is a revision of the first digital-document, the indicator including at least a portion of the first digital-timestamp;
transmitting the second digital-fingerprint from the first system to the second system;
creating a second digital-timestamp including the second digital-fingerprint and a second digital-time;
transmitting the second digital-timestamp from the second system to the first system.

5. The method of claim 4, further comprising:
determining whether the second digital-timestamp is authentic including
determining whether the digital-timestamp was produced on the second system and
determining whether the digital-timestamp has been altered since it was produced; and
determining whether the second digital-document is authentic depending on the determination of authenticity of the second digital-timestamp and depending on the second digital-fingerprint contained in the first digital-timestamp;
and in which the step of determining whether the second digital-timestamp is authentic, includes the steps of:
storing the second digital-timestamp in a second storage of the second system, the second storage being secure from direct access by the user;
transmitting the second digital-timestamp between the first system and the second system;
retrieving the second digital-timestamp from the second storage;
comparing the second digital-timestamp that was transmitted with the digital-timestamp that was retrieved from on the second storage; and
determining whether the digital-timestamp is authentic depending on the comparison.

6. The method of claim 4, further comprising:
determining whether the second digital-timestamp is authentic including
determining whether the digital-timestamp was produced on the second system and determining whether the digital-timestamp has been altered since it was produced; and determining whether the second digital-document is authentic depending on the determination of authenticity of the second digital-timestamp and depending on the second digital-fingerprint contained in the first digital-timestamp;

and in which, the step of determining whether the second digital-timestamp is authentic, includes the steps of:
providing a private-key on the second system;
encrypting the second digital-timestamp on the second system to produce a third digital-signature;
re-transmitting the digital-timestamp from the first system to the second system;
re-encrypting the digital-timestamp using the private-key on the second system to produce a fourth digital-signature;
comparing the third digital-signature with the fourth digital-signature; and
determining whether the digital-timestamp is authentic depending on the comparison.

7. The method of claim 4, further comprising:
determining whether the second digital-timestamp is authentic including
determining whether the digital-timestamp was produced on the second system and
determining whether the digital-timestamp has been altered since it was produced; and
determining whether the second digital-document is authentic depending on the determination of authenticity of the second digital-timestamp and depending on the second digital-fingerprint contained in the first digital-timestamp;
and in which, the step of determining whether the second digital-timestamp is authentic, includes the steps of:
providing a public digital-key/private digital-key pair, the private digital-key being provided only on the second system and the public digital-key being provided on the first system;
encrypting the second digital-timestamp to produce a second digital-signature using the private-key on the second system;
transmitting the third digital-signature from the second system to the first system;
decrypting the third digital-signature using the public-key to produce a third digital-timestamp;
comparing the second digital-timestamp with the third digital-timestamp;
determining whether the second digital-timestamp is authentic depending on the comparison.

8. The method of claim 4, further comprising:
determining whether the second digital-timestamp is authentic including
determining whether the digital-timestamp was produced on the second system and
determining whether the digital-timestamp has been altered since it was produced; and
determining whether the second digital-document is authentic depending on the determination of authenticity of the second digital-timestamp and depending on the second digital-fingerprint contained in the first digital-timestamp;
and wherein
the second digital-fingerprint is derived by the steps of: hashing the second digital-document using a one-way hash algorithm; and encrypting the combination to produce a second digital-signature; and determining whether the second digital-document is authentic includes the steps of:
hashing the second digital-document using the one-way hash algorithm and combining with the indicator of the first digital-document to produce a third digital-fingerprint;
decrypting the second digital-signature contained in the authenticated digital-timestamp to produce a fourth digital-fingerprint;
comparing the third digital-fingerprint with the fourth digital-fingerprint to determine whether the second digital-document is authentic.

9. The method of claim 4 in which the step of determining whether the second digital-timestamp is authentic, includes the steps of:
providing a private-key on the second system;
encrypting the second digital-timestamp on the second system to produce a third digital-signature;
storing the third digital-signature in a second storage of the second system the storage being secure from direct access by the user;
transmitting the second digital-timestamp between the first system and the second system;
retrieving the third digital-signature from the second storage;
decrypting the third digital-signature and comparing the result to the second digital-timestamp or encrypting the second digital-timestamp and comparing the result to the third digital-signature; and
determining whether the digital-timestamp is authentic depending on the comparing.

10. A method for producing signed digital-revisions of digital-documents, comprising:
providing a first digital-document;
revising the first digital-document to produce a digital-revision, the digital-revision being a second digital-document separate or separable from the first digital-fingerprint;
deriving a second digital-fingerprint from both the first digital-document and the digital-revision;
and in which the digital-fingerprint is a digital-document separate or separable from the digital-documents from which the digital-fingerprint was derived, is smaller than the digital-documents from which the digital-fingerprint was derived, and provides evidence that the digital-documents from which the digital-fingerprint was derived:
are the digital-documents from which the digital-fingerprint was derived; and
have not been altered since the digital-fingerprint was derived.

11. The method of claim 10 in which the digital-revision includes at least a portion of the first digital-document.

12. The method of claim 10 in which the digital-revision includes changes to the first digital-document.

13. The method of claim 10 in which deriving the digital-fingerprint includes using a one-way-hash algorithm to derive smaller different digital-documents from each digital-document from which the fingerprint was derived.

14. A method for producing signed digital-revisions of digital-documents, comprising:
providing a first digital-document;
revising the first digital-document to produce a digital-revision, the digital-revision being a second digital-document separate or separable from the first digital-fingerprint;

deriving a second digital-fingerprint from both the first digital-document and the digital-revision;
  in which the digital-fingerprint is a digital-document separate or separable from the digital-documents from which the digital-fingerprint was derived, is smaller than the digital-documents from which the digital-fingerprint was derived, and provides evidence that the digital-documents from which the digital-fingerprint was derived:
are the digital-documents from which the digital-fingerprint was derived; and
have not been altered since the digital-fingerprint was derived; and
  in which the digital-fingerprint is a digital-signature derived by applying a private digital-key such that without using the private digital-key, an associated public digital-key can be applied to the digital-signature to provide evidence both that the associated private digital-key was used to produce the digital-signature and that the digital-document from which the digital-signature was derived has not been altered since the digital-signature was produced.

15. The method of claim 14 in which the digital-signature is produced by a method selected from: digitally signing the digital-documents by encrypting the digital-documents with the private digital-key and then using a one-way hashing algorithm to hash the signed digital-documents to derive a digital-signature for the digital-documents; and using a one-way hashing algorithm to hash the first digital-document to derive an intermediate digital-document and then signing the intermediate digital-document by encrypting the intermediate digital-document with the private digital-key to derive the digital-signature for the digital-documents.

16. The method of claim 10 in which:
the method further comprises the step of providing digital-times for the digital-documents; and
the digital-fingerprint is also derived from the digital-times such that the digital-fingerprint provides evidence that both the digital-documents and the digital-times are associated and have not been altered since the digital-fingerprint was produced.

17. The method of claim 10 further comprising the steps of:
deriving a first digital-fingerprint for the first digital-document;
providing a first digital-time for the first digital-document; and
deriving a third digital-fingerprint from both the first digital-fingerprint and the digital-time such that the third digital-fingerprint provides evidence that both the first digital-fingerprint and the first digital-time have not been altered since the third digital-fingerprint was produced.

18. The method of claim 17 in which the second digital-fingerprint is derived from the third digital-fingerprint such that the second digital-fingerprint is derived from the digital-time and the first digital-fingerprint, and thus from the first digital-document.

19. The method of claim 10 further comprising the steps of:
providing a first digital-time for the first digital-document; and
deriving a first digital-timestamp from both the digital-time and the first digital-document, the digital-timestamp being a separate digital-document indicating a relationship between the digital-time and the first digital-document.

20. The method of claim 19 in which:
the method further comprises deriving a first digital-fingerprint for the first digital-document; and
the first digital-time and the first digital-fingerprint are appended together into a separate digital-document to form the first digital-timestamp that is thus, derived from the first digital-document.

21. The method of claim 20 in which the second digital-fingerprint is derived from both the first digital-revision and the digital-timestamp and thus from both the digital-time and the first digital-fingerprint contained in the digital-timestamp and thus from the first digital-document.

22. The method of claim 20 further comprising the step of:
deriving a third digital-fingerprint from the first digital-timestamp such that the third digital-fingerprint is derived from both the first digital-time and the first digital-fingerprint contained in the digital-timestamp.

23. The method of claim 22 in which the second digital-fingerprint is derived from both the digital-revision and the third digital-fingerprint and thus from the digital-time and the first digital-fingerprint contained in the first digital-timestamp and thus from the first digital-document.

24. The method of claim 19 in which:
the first digital-timestamp is produced in a secure portion of the system to which a user does not have direct access though said user has access to another portion of the system to derive the first digital-fingerprint from the first digital-document;
the method further comprises the steps of:
transmitting the first digital-fingerprint from the user accessible portion to the secure portion of the system; and
receiving the first digital-timestamp in the user accessible portion from the secure portion of the system.

25. The method of claim 22 in which:
the first digital-timestamp and third digital-fingerprints are derived in a second secure portion of the system to which a user does not have direct access though said user has access to a first portion of the system to derive the first digital-fingerprint from the first digital-document so that the user cannot control deriving the first digital-timestamp and third digital-fingerprint;
the method further comprises the steps of:
transmitting the first digital-fingerprint from the first portion to the second portion of the system; and
receiving the digital-timestamp and/or the third digital-fingerprint in the first portion from the second portion into the first portion of the system.

26. The method of claim 10 in which:
the method further comprises the step of providing a digital-time for the digital-revision; and
the second digital-fingerprint is derived from the first digital-document, the digital-revision and the second digital-time.

27. The method of claim 10 further comprising the steps of:
providing a digital-time for the digital-revision; and
deriving a fourth digital-fingerprint derived from both the second digital-fingerprint and the digital-time.

28. The method of claim 10 further comprising the steps of:
providing a second digital-time for the digital-revision; and combining the second digital-fingerprint with the second digital-time to produce a second digital-timestamp.

29. A method for producing digitally-timestamped digital-revisions of digital-documents, comprising:
providing a first digital-document;
providing a first digital-time for the first digital-document;
producing a first digital-timestamp derived from both the first digital-document and from the first digital-time to provide evidence that the first digital-time is related to the first digital-document;
revising the first digital-document to produce a digital-revision which is a second digital-document;
providing a second digital-time for the digital-revision;
producing a second digital-timestamp derived from the digital-revision, the second digital-time, and an indicator of the first digital-document to provide evidence that digital-time corresponds to the digital-revision and that the digital-revision corresponds to the first digital-document, the indicator being derived from the first digital-document or from at least a portion of the first digital-timestamp;
wherein the first and second digital-timestamps are digital-documents independent from and separate or separable from the first and second digital-documents respectively.

30. The method of claim 29 in which:
producing the first digital-timestamp includes: deriving a first digital-fingerprint from the first digital-document; and combining the first digital-fingerprint with the first digital-time to form the first digital-timestamp; and
producing the second digital-timestamp includes: deriving a second digital-fingerprint from the digital-revision; and combining the second digital-fingerprint, the second digital-time, and the indicator of the first digital-document to form the second digital-timestamp.

31. The method of claim 30 in which:
the method further comprises deriving a third digital-fingerprint from the first digital-timestamp; and
the indicator of the first digital-document includes the third digital-fingerprint.

32. The method of claim 30 in which the indicator of the first digital-document includes or is derived from at least one of the following specific indicators: the digital-fingerprint of the first digital-document; the digital-time for the first digital-document; and a digital-sequence-number, digital-name, or another indicator of the original document added to the first digital-timestamp by a portion of the system that is secure from access by a user.

33. A digital-fingerprint derived from a digital-revision of a first digital-document and on an indicator of the first digital-document that is not contained in the digital-revision so as to provide evidence that the digital-revision is derived from the first digital-document and that the digital-revision has not be altered since the digital-fingerprint was produced.

34. A digital-timestamp comprising:
a digital-fingerprint derived from a digital-revision of a first digital-document, the digital-revision being a second digital-document, the digital-timestamp being separate or separable from the digital-revision and from the first digital-document;
a digital-time for the digital-revision indicating the existence of the digital-revision at a time before the digital-time; and
means to indicate the first digital-document for providing evidence that the digital-revision is a revision of the first digital-document.

35. A computer system, comprising:
means for providing a first digital-document;
means for deriving a first digital-fingerprint from the first digital-document;
means for revising the first digital-document to produce a digital-revision which is a second digital-document, the digital-revision being a second digital-document that is separate or separable from the first digital-document and
means for deriving a second digital-fingerprint from both the first digital-fingerprint and the digital-revision;
and in which each digital-fingerprint is a digital-document that is: independent and separate or separable from the digital-document or digital-documents on which it depends; and provides evidence that the digital-document or digital-documents from which the digital-fingerprint was derived:
is the digital-document or digital-documents from which the digital-fingerprint was derived; and
has not been altered since the digital-fingerprint was produced.

36. The system of claim 35 in which:
the respective means for deriving the first and second digital-fingerprints use the same one-way-hash algorithm to produce respective hashes which are smaller different separate or separable digital-documents than the digital-documents upon which the digital-fingerprints were derived;
each digital-fingerprint is a respective digital-signature produced by applying a private digital-key to the respective hash such that without using the private digital-key, an associated public digital-key can be applied to the digital-signature to provide evidence both that the associated private digital-key was used to produce the digital-signature and that the digital-document on which the digital-signature is based has not been altered since the digital-signature was produced.

37. The system of claim 35 in which:
the system further comprises means for providing different first and second digital-times respectively for the first and second digital-documents indicating a time before which the first and second digital-documents respectively, existed; and
the means for deriving the first and second digital-fingerprints, derive the digital-fingerprints from the first and second digital-times respectively such that the digital-fingerprints also provide evidence that the associated digital-times have not been altered since the digital-fingerprints were produced.

38. The system of claim 37 in which the means for deriving the second digital-fingerprints, derive the second digital-fingerprints, from the digital-time associated with the first digital-document.

39. A computer system, comprising:
means for providing a first digital-document;
means for deriving a first digital-fingerprint from the first digital-document, the first digital-fingerprint indicating that the first digital-fingerprint is for the first digital-document and that the first digital-document has not been altered since the first digital-fingerprint was produced;
means to produce a first digital-time for the first digital-document for indicating a time before which the first digital-fingerprint existed;

means for deriving first digital-timestamp from both the first digital-fingerprint and first digital-time to indicate that the first digital-time is for the first digital-fingerprint and thus, for the first digital-document, the digital-timestamp being a separate or separable digital-document;

means for revising the first digital-document to produce a digital-revision, the digital-revision being a second digital-document;

means for deriving a second digital-fingerprint depending on the digital-revision, the second digital-fingerprint indicating that the second digital-fingerprint is for the digital-revision and that the digital-revision has not been altered since the second digital-fingerprint was produced;

means to produce a second digital-time for the digital-revision for indicating a digital-time at which the second digital-time was created and at which the second digital-fingerprint existed and thus a time after the digital-revision began existing;

means for deriving a second digital-timestamp from the second digital-fingerprint, the second digital-time, and an indication of the first digital-document which indicates to provide evidence that the second digital-time is for the second digital-fingerprint and thus for the digital-revision, and that the digital-revision is a revision of the first digital-document, the second digital-timestamp being a separate digital-document;

and in which each digital-fingerprint is a digital-document separate or separable from the digital-document on which the digital-fingerprint depends and is smaller than the digital-document on which the digital-fingerprint depends.

40. The system of claim 39 in which each digital-timestamp contains the digital-time and the associated digital-fingerprint that the digital-timestamp indicates that the digital-time is for.

41. The system of claim 40 in which the second digital-timestamp also contains at least a portion of the first digital-timestamp.

42. The system of claim 40 in which:

the system further comprises means for deriving a third digital-fingerprint from the first digital-timestamp; and the second digital-timestamp is derived from the third digital-fingerprint as the indication that the second digital-document is a revision of the first digital-document.

43. A method of operating a computer network, comprising the steps of:

providing a first digital-document on a first computer system with user access;

deriving a first digital-signature from the first digital-document on the first system;

transmitting the first digital-signature from the first system to a second computer system that is secure from direct user access;

creating a first digital-timestamp derived from the first digital-signature and a first digital-time;

transmitting the first digital-timestamp from the second system to the first system;

revising the first digital-document to produce a second digital-document;

deriving a second digital-signature from the second digital-document;

transmitting the second digital-signature and an indicator of the first digital-document from the first system to the second system, the indicator providing evidence that the second digital-document is being dependent on at least one of: the first digital-signature and the first digital-time;

creating a second digital-timestamp derived from the second digital-signature, the indicator of the first digital-document, and a second digital-time;

transmitting the second digital-timestamp from the second system to the first system;

determining whether the second digital-timestamp is authentic;

determining whether the second digital-document is authentic depending on the determination of authenticity of the second digital-timestamp and depending on the second digital-fingerprint from which the second digital-timestamp was derived.

44. The method of claim 43, further comprising the step of determining whether the second digital-document is a revision of the first digital-document depending on the indicator of the first digital-document.

45. The method of claim 43, further comprising the step of determining whether the second digital-document is a revision of the first digital-document depending on the indicator of the first digital-document.

46. A computer system, comprising:

means for providing a digital-revision which is a digital-document that is a revision of an original digital-document;

cryptographic means for providing an indicator for the original digital-document that can be used to identify the original digital-document and which is not contained in the digital-revision, said indicator providing evidence that the original digital-document has not been revised;

means for providing a private-key for encrypting digital-documents and public-keys for decrypting documents encrypted by the private-key;

means for encrypting the digital-revision or a fingerprint document derived from the digital-revision together with the indication of the original document using a private-key of the signor to form a digital-signature for the digital-revision, the digital-signature providing evidence that: the digital-signature was produced by the private-key; the digital-revision has not been changed since the digital-signature was produced; and the digital-revision is derived from the original digital-document.

47. A digital-signature derived from a digital-revision which is a digital-document that is a revision of an original digital-document, the digital-signature being derived by encrypting the digital-revision or a fingerprint of the digital-revision, the encryption using a private-key of a signor, the digital-signature comprising:

means for indicating that the signature was produced using the private-key of the signor;

means for indicating that the revised digital-document has not been modified since the signature was produced; and means for indicating that the revised digital-document is derived from the original document, the means for indicating not being contained in the revised digital-document.

48. A method for producing digitally-timestamped digital-revisions of digital-documents, comprising:

means for providing a first digital-document;

means for providing a first digital-time for the first digital-document;

means for producing a first digital-timestamp derived from both the first digital-document and from the first digital-time to provide evidence that the first digital-time is related to the first digital-document;

means for revising the first digital-document to produce a digital-revision which is a second digital-document;

means for providing a second digital-time for the digital-revision; and means for producing a second digital-timestamp derived from the digital-revision, the second digital-time and an indicator of the first digital-document to provide evidence that the second digital-time is related to the digital-revision and that the digital-revision is a revision of the first digital-document, the indicator being derived from the first digital-document or from at least a portion of the first digital-timestamp;

and wherein the first and second digital-timestamps are digital-documents independent and separate or separable from the first and second digital-documents respectively.

49. A method, comprising:

providing a first digital-document;

revising the first digital-document to produce a second digital-document;

deriving a second digital-fingerprint from both a second indicator of the second digital-document and a first indicator of the first digital-document, which first indicator can not be derived from the second digital-document.

50. The method of claim 49 in which the first indicator is the first digital-document.

51. The method of claim 49 in which the first indicator is a first digital-fingerprint derived from the first digital-document.

52. The method of claim 51 in which the first indicator is derived by encrypting the first digital-document.

53. The method of claim 51 in which the first indicator is derived by one-way hashing the first digital-document to produce a first digital-fingerprint.

54. The method of claim 51 in which the first indicator is derived by one-way hashing the first digital-document to produce a hash and then encrypting the hash to form a digital-signature which is a first digital-fingerprint.

55. The method of claim 49 in which the first indicator is an identifier for the first digital-document and its relation between the identifier and the first digital-document or a third indicator derived from the first digital-document that is digitally stored.

56. The method of claim 55 in which the first indicator is a digital-time for the digital-document.

57. The method of claim 55 in which the first indicator, and a third indicator of the first document that was derived from the first document, and an indicator of the relation between the first indicator and the third indicator, are stored in a system which is secure from a user.

58. The method of claim 57 in which the third indicator is a fingerprint of the first document and the first indicator is a digital-time for the first document.

* * * * *